US006981080B2

(12) United States Patent
Thompson et al.

(10) Patent No.: US 6,981,080 B2
(45) Date of Patent: Dec. 27, 2005

(54) LOOK-UP TABLE BASED USB IDENTIFICATION

(75) Inventors: Robert D Thompson, Loveland, CO (US); John Mark Carleton, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 852 days.

(21) Appl. No.: 09/773,026

(22) Filed: Jan. 31, 2001

(65) Prior Publication Data

US 2002/0103952 A1     Aug. 1, 2002

(51) Int. Cl.[7] ............................................. G06F 13/00
(52) U.S. Cl. ...................... 710/104; 710/8; 710/10; 710/16; 713/2
(58) Field of Search ............................ 710/8–19, 104; 713/1, 2, 100

(56) References Cited

U.S. PATENT DOCUMENTS

| | | | | |
|---|---|---|---|---|
| 5,042,265 A | * | 8/1991 | Baldwin et al. ............... 62/127 |
| 5,983,288 A | * | 11/1999 | Visee ........................... 710/16 |
| 6,023,736 A | * | 2/2000 | Lambeth et al. ............... 710/10 |
| 6,138,182 A | * | 10/2000 | Hennessy et al. ............. 710/16 |
| 6,192,420 B1 | * | 2/2001 | Tsai et al. ...................... 710/10 |
| 6,484,219 B1 | * | 11/2002 | Dunn et al. .................... 710/42 |
| 6,748,515 B1 | * | 6/2004 | Hendrickson et al. ........ 712/32 |
| 6,804,727 B1 | * | 10/2004 | Rademacher .................. 710/9 |
| 2002/0133694 A1 | * | 9/2002 | Ray et al. ....................... 713/1 |
| 2003/0005274 A1 | * | 1/2003 | Bresemann et al. ........... 713/1 |

FOREIGN PATENT DOCUMENTS

| | | |
|---|---|---|
| EP | 0933711 A | 8/1999 |
| EP | 1100018 A | 5/2001 |
| JP | 282478 A | 10/2001 |

OTHER PUBLICATIONS

Universal Serial Bus Specification, Revision 2.0, Apr. 27, 2000.

* cited by examiner

*Primary Examiner*—Glenn A. Auve
(74) *Attorney, Agent, or Firm*—Alexander J. Neudeck

(57) ABSTRACT

An embodiment of USB device comprises a lookup table in a fixed electronically readable medium comprising a plurality of product identification information entries. The USB device also has an electronically readable index that selects one of the plurality of product identification information entries, and the vendor identification information is stored in a location separate from the index.

12 Claims, 3 Drawing Sheets

LOOK-UP TABLE BASED USB IDENTIFICATION

FIELD OF THE INVENTION

This invention relates generally to the Universal Serial Bus (USB) and more particularly to methods and apparatus for providing USB identification information.

BACKGROUND OF THE INVENTION

The Universal Serial Bus (USB) is a peripheral bus specification developed by personal computer (PC) and telecommunication industry companies that brings the plug and play features of computer peripherals outside the PC box. This eliminates the need to install cards into dedicated computer slots and reconfigure the system. Personal computers equipped with USB allow computer peripherals to be automatically configured as soon as they are physically attached. This eliminates the need to reboot or run setup software. USB also allows multiple devices to run simultaneously on a computer, with dedicated hubs and peripherals such as monitors and keyboards also acting as additional plug-in sites.

The Universal Serial Bus is defined in the Universal Serial Bus Specification, revision 2.0, Apr. 27, 2000 which is hereby incorporated herein by reference. This document is available from the USB Implementers Forum web page at http://www.usb.org.

At least two of the pieces of identification information required to be supplied by a device on a USB bus are a vendor identification (Vendor ID or idVendor) and a product identification (Product ID or idProduct). In addition, optional identification information such as strings describing the product, serial number, and manufacturer may also be supplied. This identification information may be used by the host computer to correctly install drivers and/or other related software that allows the computer to interact with the device.

One way of storing identification information on a USB capable device uses nonvolatile memory (NVRAM). Unfortunately, NVRAM components are subject to various failure mechanisms such as electrical noise, incorrect programming sequences, certain power failures, radiation, and others. If the identification information is lost or incorrect, the computer may not be able to interact with the device, or may interact incorrectly.

Developers of USB hardware may also have an issue with storing identification information in NVRAM. This issue arises because a NVRAM is programmable. Accordingly, it is possible for an entity other than the one that paid for the development of the hardware, to program the identification information to indicate a different vendor and manufacturer than the one who paid for the development of the USB hardware. This allows the non-developing entity to take a free-ride on hardware development costs.

Accordingly, there is a need in the art for an improved way of providing identification information on a USB capable device. This way should eliminate or improve upon the failure mechanisms associated with NVRAM. It is also desirable that the solution be able to provide identification information for more than one type of USB device so that the development costs may be spread across several products yet not allow other makers of USB equipment a free-ride on those development costs.

SUMMARY OF THE INVENTION

The invention provides reliable identification information for multiple products but with a fixed vendor information. A lookup table is fixed in electronically readable hardware such as a ROM inside of an integrated circuit responsible for controlling or interfacing with a USB bus. An index is read and used to pick an entry in the lookup table. That entry provides a Product ID that is combined with fixed vendor information to complete the identification information provided for in the USB specification.

Other aspects and advantages of the invention will become apparent from the following detailed description, taken in conjunction with the accompanying drawings, illustrating by way of example the principles of the invention.

DETAILED DESCRIPTION OF THE PREFERRED EMBODIMENTS

Figure 1:
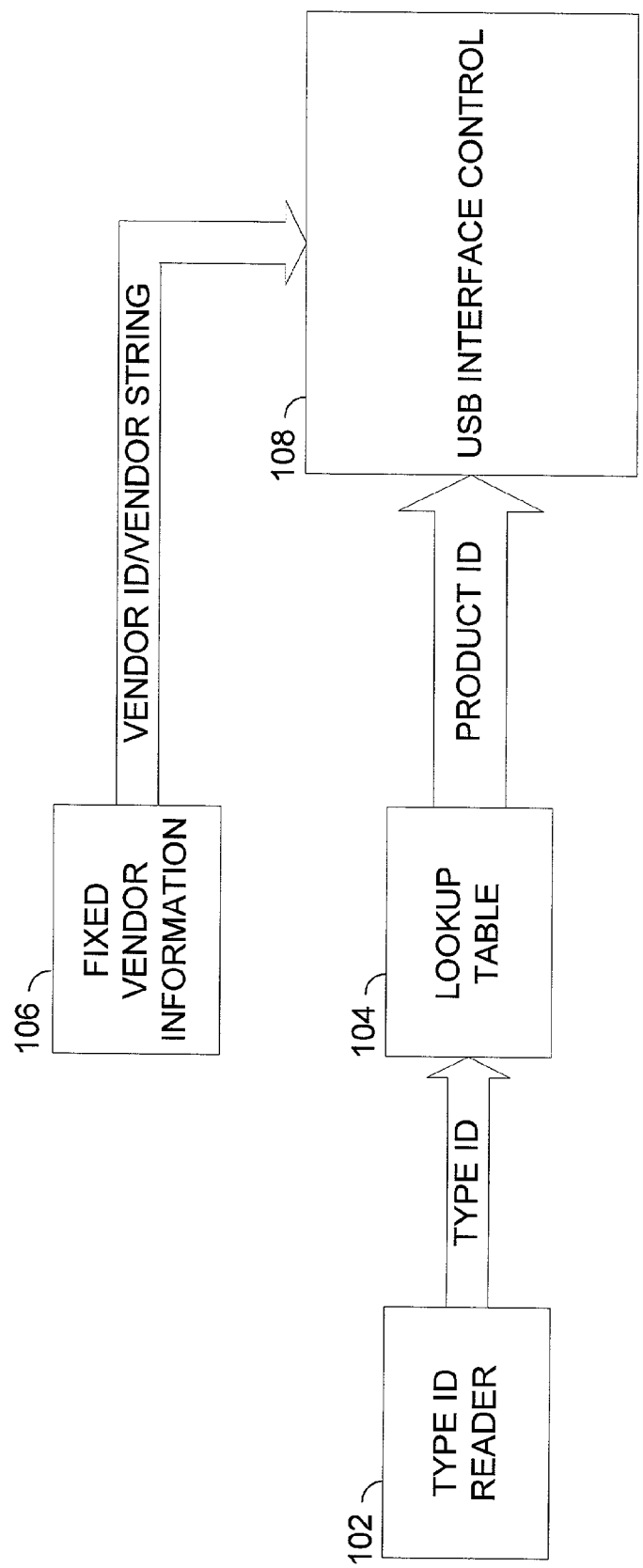
FIG. 1 is block diagram of a system for providing identification information on a USB device.

FIG. 1 is block diagram of a system for providing identification information on a USB device. Block 102 represents circuitry that reads a Type ID. The Type ID may be read on dedicated pins on an integrated circuit, or pins that are multiplexed with other functionality, or any other means well known in the art for providing such mode or configuration information. The Type ID may be set on those pins by jumpers, by appropriate connections on a printed circuit board, or any other means well known in the art for setting such mode or configuration information.

Figure 3:
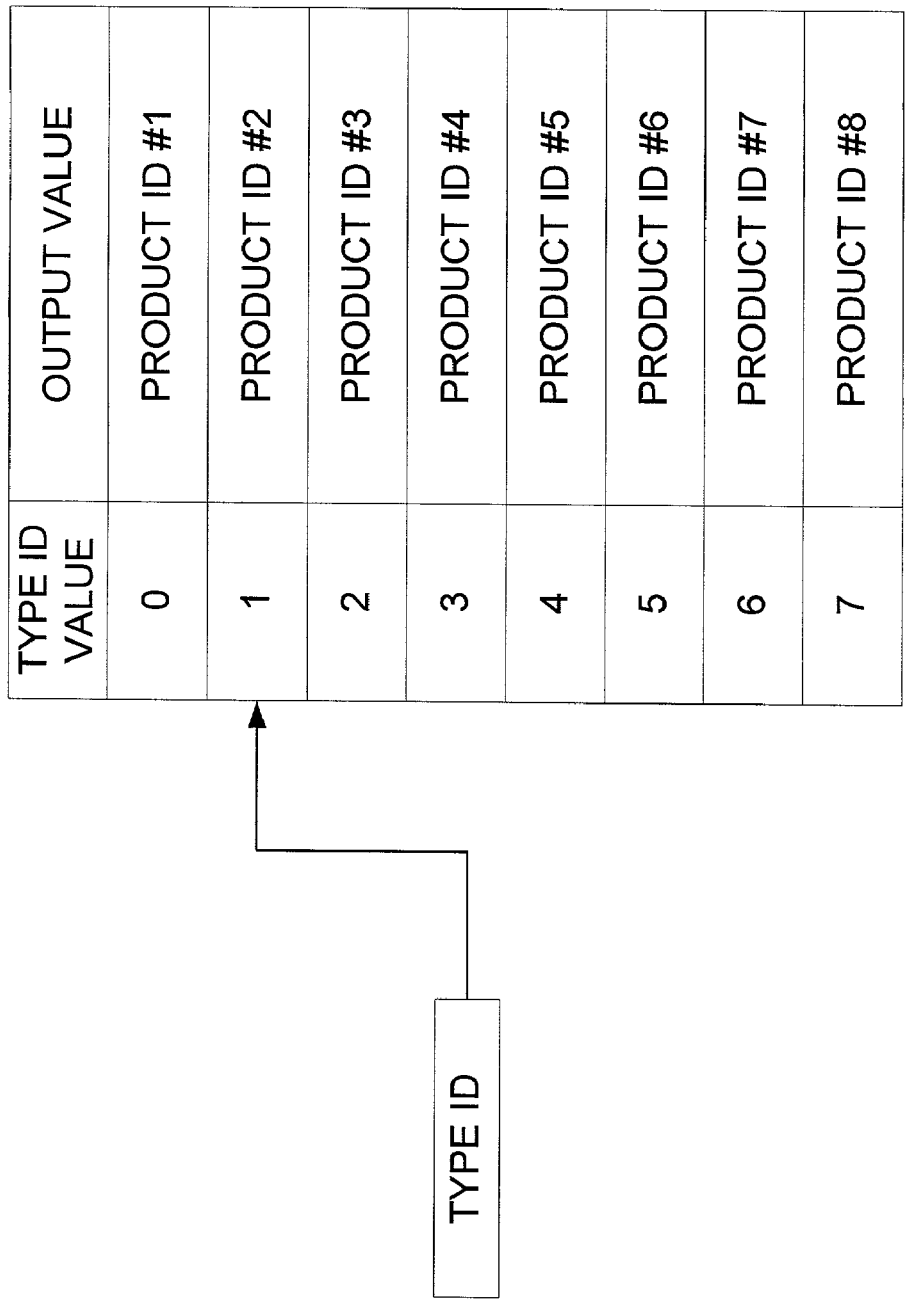
FIG. 3 is an illustration of a lookup table for providing Product ID identification information on a USB device from a Type ID.

The Type ID used as an index or offset into a lookup table 104 that outputs a Product ID. FIG. 3 is an illustration of a lookup table for providing Product ID identification information on a USB device from a Type ID. The Product ID is then passed to the USB interface control 108 so it may provide that information to the host computer at the appropriate time. The USB interface control also obtains, or has stored inside it, fixed vendor information 106 which is at least a Vendor ID and optionally a Vendor String. The vendor information together with the Product ID provides sufficient information for the USB interface control to provide the complete identification information provided for in the USB specification.

Figure 2:
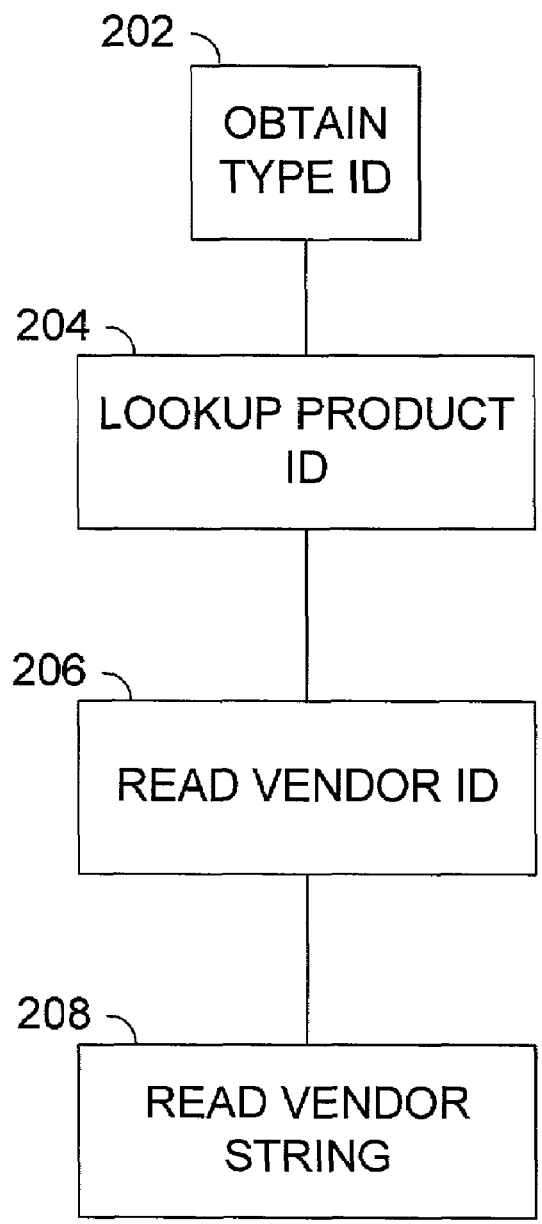
FIG. 2 is a flowchart for providing identification information on a USB device.

FIG. 2 is a flowchart for providing identification information on a USB device. In a step 202, a Type ID is obtained. In a step 204, the Type ID is used an index or offset to lookup a Product ID. FIG. 3 is an illustration of a lookup table for providing Product ID identification information on a USB device from a Type ID. In a step 206, a Vendor ID is read. In a step 208, a Vendor String is optionally read. The vendor information together with the Product ID provides sufficient information for the USB interface control to provide complete identification information provided for in the USB specification.

In a preferred embodiment, the Vendor ID, Vendor String, and table of Product ID's are stored in a fixed medium such as ROM (Read Only Memory) inside of an integrated circuit that controls or interfaces with the USB bus. This helps reduce the number of components and save cost since a separate NVRAM is no longer needed. In addition, the same electronics for controlling/interfacing with a USB bus may be used for multiple products produced by a single company even though these multiple products may be required to have unique Product ID's. For example, one product may have more advanced features than another produced by the same company and therefore require different software drivers on the host computer. This invention allows the same USB electronics to be used and still have that electronics provide different Product ID's to the host computer by setting different Type ID's. Finally, the fact that the Vendor ID and Vendor String are stored in a fixed medium prevents other companies from using the same USB electronics because that electronics would provide the Vendor ID and Vendor String of the company that designed, or paid for the design, of the USB electronics.

Although several specific embodiments of the invention have been described and illustrated, the invention is not to be limited to the specific forms or arrangements of parts so described and illustrated. The invention is limited only by the claims.

What is claimed is:

1. A USB device, comprising:
   a lookup table in fixed electronically readable medium comprising a plurality of product identification information entries;
   an electronically readable index that selects one of said plurality of product identification information entries; and
   vendor identification information stored in a location separate from said lookup table.

2. The USB device of claim 1 wherein said electronically readable index is set by connections on a printed circuit board.

3. The USB device of claim 1 wherein said electronically readable index is set by jumper connections.

4. The USB device of claim 1 wherein said electronically readable index is set by the logic state of pins on an integrated circuit wherein those pins an integrated circuit also have a function different from setting said electronically readable index.

5. The USB device of claim 1 wherein said electronically readable index is set by connections internal to an integrated circuit also said lookup table.

6. The USB device of claim 1 wherein said vendor identification information comprises a vendor identification number and a vendor identification string.

7. The USB device of claim 1 wherein said vendor identification information is stored in an electronically readable fixed medium.

8. The USB device of claim 7, wherein said electronically readable medium is read-only-memory.

9. An apparatus, comprising:
   a USB interface;
   a lookup table in fixed electronically readable medium supplying product identification information to said USB interface;
   means for supplying an index into said lookup table to choose said product identification information from a plurality of product identification information entries; amnd
   vendor identification information located separate from said lookup table.

10. The apparatus of claim 9 further comprising vendor identification information in fixed electronically readable medium.

11. The apparatus of claim 9 wherein said vendor identification information comprises a vendor identification number and a vendor identification string.

12. The apparatus of claim 9 wherein said vendor identification information is in a fixed electronically readable medium.

* * * * *

UNITED STATES PATENT AND TRADEMARK OFFICE
CERTIFICATE OF CORRECTION

| | | |
|---|---|---|
| PATENT NO. | : 6,981,080 B2 | Page 1 of 1 |
| APPLICATION NO. | : 09/773026 | |
| DATED | : December 27, 2005 | |
| INVENTOR(S) | : Robert D Thompson et al. | |

It is certified that error appears in the above-identified patent and that said Letters Patent is hereby corrected as shown below:

On the title page, item (57), under "ABSTRACT", in column 2, line 1, delete "An embodiment of USB device comprises" and insert -- A USB device includes --, therefor.

In column 4, line 3, in Claim 4, after "pins" insert -- on --.

In column 4, line 8, in Claim 5, after "also" insert -- containing --.

In column 4, line 25, in Claim 9, delete "amnd" and insert -- and --, therefor.

In column 4, lines 34 – 36, in Claim 12, delete "wherein said vendor identification information is in a fixed electronically readable medium." and insert -- , wherein said lookup table and said vendor identification are located on an integrated circuit. --, therefor.

Signed and Sealed this

Second Day of June, 2009

JOHN DOLL
*Acting Director of the United States Patent and Trademark Office*